June 29, 1943.  F. W. THOMPSON  2,323,256
STOVEPIPE SEAM
Filed April 1, 1941
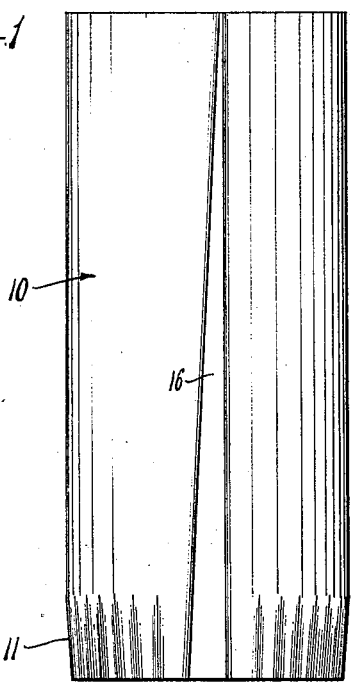
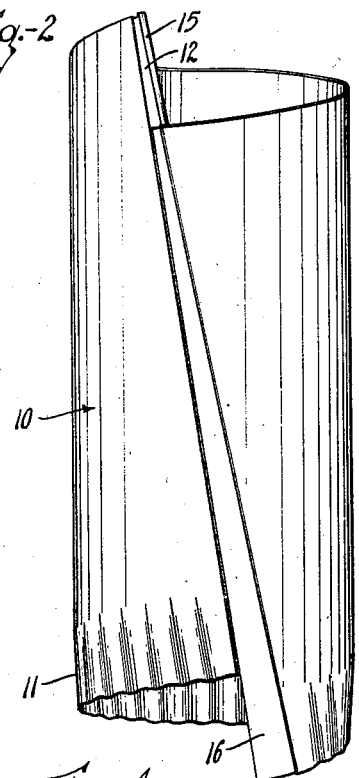
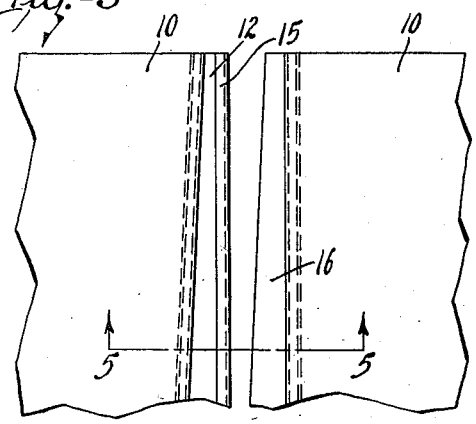
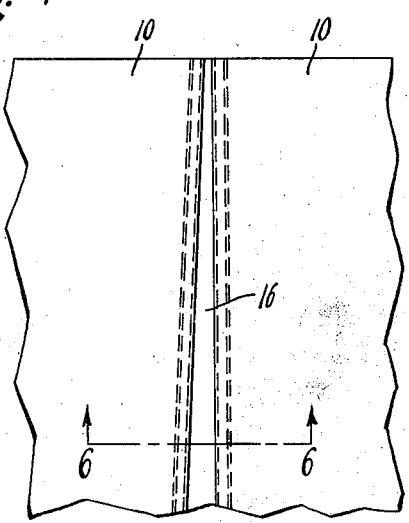
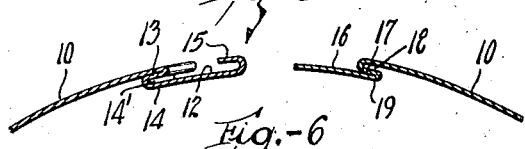
INVENTOR
FRANK W. THOMPSON
BY
ATTORNEYS Patented June 29, 1943

2,323,256

UNITED STATES PATENT OFFICE 2,323,256

STOVEPIPE SEAM

Frank W. Thompson, New Philadelphia, Ohio

Application April 1, 1941, Serial No. 386,293

2 Claims. (Cl. 138—74)

This invention relates to improvements in locking means for the edges of sheet metal stovepipes and the like.

An object of the invention is to provide a locking seam for stovepipes which may be quickly and easily moved into permanent locking position with a minimum of effort and yet provide maximum security of connection and strength.

Another object is to provide a seam of the character referred to which will not be subject to accidental separation and yet does not require the use of clamps or rivets to hold it together.

A further object is to provide one edge of a sheet metal stovepipe with a tapered groove and the other edge with a tapered tongue arranged to slidably fit in said groove and form a locking connection therewith.

Other objects and advantages will become apparent from the following description taken in conjunction with the accompanying drawing.

In the drawing:

Fig. 1 is a side elevation of a stovepipe section embodying my invention,

Fig. 2 is a perspective view showing how the tapered tongue is inserted in the tapered groove, Fig. 3 is an enlarged fragmentary view with the edges of the stovepipe in parallel unlocked relation, Fig. 4 is a similar view with the edges locked together, Fig. 5 is a section taken substantially on line 5—5 of Fig. 3, and Fig. 6 is a section taken substantially on line 6—6 of Fig. 4.

Referring to the drawing the numeral 10 designates a section of sheet metal stovepipe which is substantially annular in cross-section and of substantially uniform diameter, except at one end which may be slightly tapered and corrugated as at 11 to facilitate assembly with an adjoining section of stovepipe.

One edge of the stovepipe section is provided with a tapered groove 12 which in this instance has its widest portion at the lower end of the member 10, as viewed in Figs. 1 and 2, and gradually decreases in width toward its upper end. However, the direction of the taper may be reversed if desired.

The groove 12 may be formed in any suitable manner and the specific manner shown herein is to be considered only as one of a number of embodiments which may be utilized. As shown herein, groove 12 is formed by bending the edge of the metal to provide an inwardly folded portion 13 and an outwardly folded portion 14 spaced from the portion 13 to form a pocket 14', said portions being disposed obliquely to the axis of the pipe section. The outer end of the portion 14 is then turned upwardly and inwardly into parallelism with the bottom wall of the groove 12 to provide a flange 15 that converges toward the portions 13, 14. In bending the metal the desired tapered formation is observed with the pocket 14' and flange 15 of uniform size throughout the length of the pipe section whereby the completed arrangement will be as most clearly indicated in Figs. 3, 5 and 6.

The other edge of the member 10 is provided with a tongue 16 which tapers in the same direction as the groove 12 and is of a size suitable to nest snugly in groove 12. In the present embodiment, tongue 16 is formed by bending the edge portion of the metal structure inwardly upon itself, obliquely with relation to the margin thereof, to provide an inwardly folded portion 17, spaced from the body of the member 10 as indicated by the space 18. The metal is then bent outwardly as indicated at 19, parallel to the last mentioned bend, whereby the tongue 16 is formed. In bending the metal the desired tapered formation is observed with the space 18 of uniform size throughout the length of the pipe structure, whereby the completed tongue will be as indicated in the drawing.

The arrangement is such as to provide a stovepipe section having one longitudinal marginal portion thereof formed with a tapered groove defined by locking formations that extend from one end of the pipe section to the other and converge toward each other, said locking formations being of uniform cross-section throughout their length, the other longitudinal marginal portion of the pipe section being formed with a locking formation extending from one end of the pipe section to the other and of uniform cross-section throughout, said locking formation being disposed obliquely with relation to the adjacent margin of the section so as to provide a tapered marginal tongue, which tongue is complemental in size to the tapered groove on the other marginal portion of the pipe section.

In locking the two edges of the stovepipe together it is only necessary to pull the edge carrying tongue 16 to approximately the position shown in Fig. 2 and insert it in the groove 12 as indicated in Fig. 2. In the position indicated the outer edge of tongue 16 easily fits into the pocket 14', and the space 18 easily receives the flange 15 on the other edge of the pipe. By then sliding tongue 16 longitudinally in groove 12 from the position shown in Fig. 2 to that shown in Fig. 1, the tongue will be securely wedged in the groove and cannot become accidentally separated. To unlock the joint it is only necessary to pull the tongue from the position shown in Figs. 1 and 4 to approximately the position shown in Fig. 2.

It is believed to be apparent that I have provided a novel stovepipe seam or joint which may be quickly and easily locked and unlocked and one which is well calculated to carry out the objects and advantages of the invention.

While I have illustrated and described one form of the invention it is to be understood that the invention is not so limited, and modification may be resorted to within the spirit of the invention and within the scope of the subjoined claims.

What is claimed is:

1. In a stovepipe, a sheet of metal having one marginal portion formed with a longitudinally tapered groove the opposite sides of which constitute pockets formed by overhanging portions of the metal structure disposed in parallelism with the bottom wall of the groove, and a tongue on the other marginal portion of the sheet, which tongue is tapered complimentary to said groove, said tongue being receivable in said groove including the lateral pockets of the latter.

2. A combination as defined in claim 1 wherein the tongue has a wedging fit with opposite sides of the groove in the operative condition of the pipe.

FRANK W. THOMPSON.